(12) United States Patent
Liktor et al.

(10) Patent No.: US 12,071,114 B2
(45) Date of Patent: Aug. 27, 2024

(54) MONITORING AND DIAGNOSTICS SYSTEM FOR A SMART FREIGHT CAR

(71) Applicant: KNORR-BREMSE Systeme für Schienenfahrzeuge GmbH, Munich (DE)

(72) Inventors: Balazs Liktor, Budapest (HU); Gabor Toth, Budapest (HU)

(73) Assignee: KNORR-BREMSE Systeme für Schienenfahrzeuge GmbH (DE)

( * ) Notice: Subject to any disclaimer, the term of this patent is extended or adjusted under 35 U.S.C. 154(b) by 607 days.

(21) Appl. No.: 17/256,579

(22) PCT Filed: Jun. 24, 2019

(86) PCT No.: PCT/EP2019/066668
§ 371 (c)(1),
(2) Date: Dec. 28, 2020

(87) PCT Pub. No.: WO2020/002235
PCT Pub. Date: Jan. 2, 2020

(65) Prior Publication Data
US 2021/0269072 A1    Sep. 2, 2021

(30) Foreign Application Priority Data
Jun. 29, 2018    (EP) ..................... 18180981

(51) Int. Cl.
*B60T 17/22* (2006.01)
*B61C 17/06* (2006.01)
(Continued)

(52) U.S. Cl.
CPC ............ *B60T 17/228* (2013.01); *B60T 17/22* (2013.01); *B61C 17/06* (2013.01); *B61K 9/00* (2013.01); *B61L 15/0081* (2013.01); *B61L 27/04* (2013.01)

(58) Field of Classification Search
CPC ........... B61K 9/00; B61C 17/06; B61L 27/04; B61L 15/0081; B60T 17/228;
(Continued)

(56) References Cited

U.S. PATENT DOCUMENTS 4,487,060 A    12/1984 Pomeroy
7,688,218 B2 *    3/2010 LeFebvre ............... B61K 13/00
340/682
(Continued)

FOREIGN PATENT DOCUMENTS

CN    201842083 U    5/2011
CN    101595022 B    6/2011
(Continued)

OTHER PUBLICATIONS

International Search Report and Written Opinion corresponding to PCT/EP2018/072580, dated Aug. 6, 2019.
(Continued)

*Primary Examiner* — Zachary L Kuhfuss
(74) *Attorney, Agent, or Firm* — Barnes & Thornburg LLP

(57) ABSTRACT

A monitoring and diagnostics system for a rail car that includes multiple sensor units, each comprising sensor devices and a data transfer unit, wherein the set of sensor units includes at least one power harvester, which is configured to convert ambient energy into electrical energy, and one energy storage means, which can be configured to store the electrical energy generated by the power harvester, a sensor hub which includes a communication subsystem and a receiver, wherein the data transfer units are configured, so that the sensor units transfer detected/measured data to the sensor hub and the communication subsystem is configured, so that the sensor hub transfers the data to the receiver, either with cable or wirelessly.

10 Claims, 1 Drawing Sheet

(51) Int. Cl.
*B61K 9/00* (2006.01)
*B61L 15/00* (2006.01)
*B61L 27/04* (2006.01)

(58) Field of Classification Search
CPC ........ B60T 17/22; B60T 17/221; B60T 17/18; B60T 2270/88; B60T 8/1705
See application file for complete search history.

(56) References Cited

U.S. PATENT DOCUMENTS

| | | | |
|---|---|---|---|
| 10,137,915 B2 * | 11/2018 | LeFebvre | G01M 17/10 |
| 2007/0152107 A1 | 7/2007 | LeFebvre | |
| 2013/0125637 A1 * | 5/2013 | Koch | B60T 17/221 73/121 |
| 2014/0372498 A1 * | 12/2014 | Mian | H04W 4/38 709/201 |
| 2015/0015060 A1 | 1/2015 | Tippey et al. | |
| 2017/0253228 A1 | 9/2017 | Naylor et al. | |
| 2017/0274916 A1 * | 9/2017 | Nock | B60T 17/20 |
| 2018/0079394 A1 * | 3/2018 | Cekola | B60T 8/323 |

FOREIGN PATENT DOCUMENTS

| | | | |
|---|---|---|---|
| CN | 103528834 A | 1/2014 | |
| DE | 102016217275 A1 * | 3/2018 | ........... B60T 13/662 |
| EP | 0391047 B1 | 12/1992 | |
| ES | 2543129 B1 | 12/2016 | |
| FR | 3046974 B1 | 7/2019 | |
| IN | 2014MU02966 A | 3/2016 | |
| WO | 2014170592 A1 | 10/2014 | |
| WO | 2016084043 A1 | 6/2016 | |

OTHER PUBLICATIONS

Wikipedia; Relay Valve; Apr. 29, 2026; 3 pages.
Natarajan et al.; Nonlinear Analysis: Hybrid Systems; Sep. 2007, vol. 1, Issue 3, pp. 430-442; ScienceDirect.

* cited by examiner

MONITORING AND DIAGNOSTICS SYSTEM FOR A SMART FREIGHT CAR

CROSS REFERENCE AND PRIORITY CLAIM

This patent application is a U.S. National Phase of International Patent Application No. PCT/EP2019/066668 filed Jun. 24, 2019, which claims priority to European Patent Application No. 18180981.5, the disclosure of which being incorporated herein by reference in their entireties.

FIELD

Disclosed embodiments relate to a monitoring and diagnostics system, especially for rail cars or freight cars.

BACKGROUND

When using freight cars, which are equipped with pneumatic brake systems, to transport goods, the freight cars, in particular their brake systems, but also the goods need to be monitored and diagnosed, so that car keepers, field operators (person who operate the brake systems by test braking operations, when making train compositions before transportation), infrastructure owners and transportation companies have detailed information on their assets. This information mainly comprises the followings:
- parameters of the pneumatic brake system (car keeper and/or field operator), parameters of the axle bearings (car keeper),
- parameters of the wheel (car keeper),
- parameters of the rail track (infrastructure owner),
- parameters of the transported goods (transportation company and their customers), and
- static data (composition of the trains, sequence of the cars in a train).

SUMMARY

According to disclosed embodiments, a monitoring and diagnostics system for a rail car comprises multiple sensor units, a sensor hub and a receiver, wherein the set of sensor units comprise at least one power harvester and one energy storage device. Each sensor unit comprises sensor devices and a data transfer unit. The sensor hub also contains a communication subsystem and optionally also sensor devices.

BRIEF DESCRIPTION OF THE FIGURES

Disclosed embodiments will become apparent by reference to the following description and drawings.

DETAILED DESCRIPTION

Figure 1:
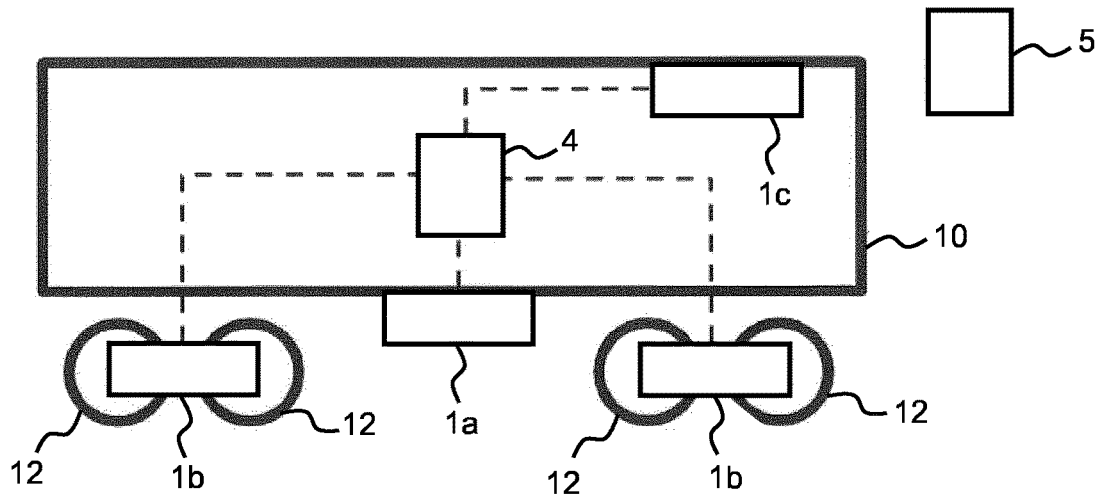
FIG. 1 is a schematic diagram of a monitoring and diagnostics system according to at least one disclosed embodiment.

Brake system parameters are for example a brake block thickness, pressure levels in the brake pipes, brake cylinders and control valves, and etc. Deviations of the measured pressure levels from the optimal pressure levels can indicate possible brake system failures such as brake valve failure, stuck or dragging brake, slow to apply brake, slow to release brake (these reaction times (release, apply, etc.) are described in detail in specific rail standards (EN15355, UIC540). Exceeding these times indicate a failure in the brake system. As a consequence, these wagons are not allowed in traffic), slow reservoir charge, or empty/load valve failure. Stuck or dragging brakes can be identified also by sensing a not allowed heat development due to the friction of the brake pad and brake disc/wheel (thread brake) by temperature sensors. Dragging brakes can also be identified by residual high pressures in the system (because of slow to release failure), or also by sensing the position of the brake mechanics. Axle bearing failures in a worst case can result in derailments. These failures can be identified by a not allowed heat development sensed by temperature sensors and also by monitoring brake system pressures, where over braking and under braking the wagon can be detected. Over braking can result in excessive heat development or flat wheels, under braking on the other hand may cause poor brake performance. Wheel parameters and geometry problems related with the wheel parameters can be identified by acceleration sensors placed on the rail cars (on the wheel axle and/or on the carriage). Rail track parameters and geometry problems related with the rail track parameters, similar to wheel parameters, can be also identified by acceleration sensors. By using a brake diagnostics system the above mentioned failure modes can be avoided by making necessary preventive measures. Transport goods should also be monitored, for example to determine the weight of goods loaded on the wagons, which is possible by monitoring valve pressures with relay valves and weighing valves included in the brake system. The monitoring method depends on the kind of the goods and rail cars. Temperature, pressure, and acceleration sensors are mostly used. There are also other parameters, such as the hatch open/close condition, to be taken into consideration.

However, the freight cars with the state of art technology lack an electric power line extending along the train, which makes it difficult to provide diverse electronic functions to diagnose rail car components or monitor goods carried by the freight cars.

Therefore, disclosed embodiments provide a monitoring and diagnostics system, especially for a rail car/freight car, which has an easy structure and contains enough energy to perform diverse electronic functions to diagnose rail car components and/or monitor goods carried by the freight cars.

The above problem is solved with a monitoring and diagnostics system according to the disclosed embodiments.

According to disclosed embodiments, a monitoring and diagnostics system for a rail car comprises multiple sensor units, a sensor hub and a receiver, wherein the set of sensor units comprise at least one power harvester and one energy storage device. Each sensor unit comprises sensor devices and a data transfer unit. The sensor hub also contains a communication subsystem and optionally also sensor devices.

The power harvester is configured to convert ambient energy into electrical energy and it can be e.g., a photovoltaic panel, a thermoelectric generator, a piezoelectric generator, an axle bearing generator or a small turbine. The power harvester is provided to energize the sensor devices and/or the data transfer unit, and/or charge the energy storage device. At least one of the sensor units in the monitoring and diagnostics system comprises a power harvester.

The energy storage device can be any type of batteries, accumulators, capacitors, ultra-capacitors or etc. At least one of the sensor units in the monitoring and diagnostics system comprises an energy storage device.

It is possible that a sensor unit contains neither a power harvester nor an energy storage device. A sensor unit without the energy storage device can be powered from other sources, e.g., from another sensor unit with an energy storage device, or from the sensor hub.

The sensor devices can be any type of analogue or digital devices depending on the measured parameters. Most commonly, pressure sensors for detecting e.g., conditions of the brake system, temperature sensors for detecting e.g., conditions of the bearings, and accelerometers or vibration sensors for measuring e.g., wheel and track geometries like flatness and roundness are used.

The data transfer unit is responsible to transfer the detected/measured data of the sensor devices to the sensor hub or and the communication subsystem is responsible to transfer the data from the sensor hub to the receiver. Data transfer may happen either with cables or wirelessly.

With this understanding in mind, FIG. 1 shows a freight car 10, its brake mechanism 12 and a monitoring and diagnostics system, which comprises sensor units 1a, 1b and 1c, a sensor hub 4, and a receiver 5. In this embodiment, the sensor unit 1a is attached to the outer chassis of the freight car 10 to measure e.g., brake system pressures; the sensor units 1b are attached to the brake mechanism 12 of the freight car 10 to measure e.g., brake system related parameters to determine whether the mechanism moves correctly or not and/or to measure the brake block thicknesses; and the sensor unit 1c is placed inside the freight car to measure conditions of the cargo, e.g., a cargo temperature (e.g., of the transported food), a cargo pressure (e.g., of the transported gases, fluids, dangerous goods), or a cargo position (e.g., of the transported boxes, coal, etc.). The sensor hub 4 is placed inside the freight car 10 and is configured to receive all the detected data from the sensor units 1a, 1b and 1c. The receiver 5 is positioned in a back-office server and is configured to receive data from the sensor hub 4 wirelessly. Alternatively, the receiver 5 can be positioned on the locomotive or on a road-/railside.

Figure 2:
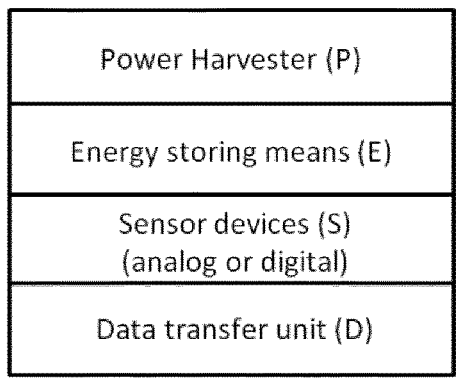
FIG. 2 is schematic diagram of the sensor units in the monitoring and diagnostics system in FIG. 1.

FIG. 2 shows one of the sensor units 1a, 1b and 1c. In this embodiment, the sensor unit 1a/1b/1c is provided with one power harvester (P), which is configured to convert ambient energy into electrical energy, and one energy storage device (E), which is configured to store the electrical energy generated by the power harvester (P). Furthermore, the sensor unit 1a/1b/1c contains sensor devices (S) and a data transfer unit (D).

In an alternative embodiment, each of the sensor units 1a, 1b and 1c comprises sensor devices (S) and a data transfer unit (D), but not all the sensor units contain a power harvester (P) or an energy storage device (E). It is possible that only one sensor unit 1a/1b/1c is provided with a power harvester (P) and only one sensor unit 1a/1b/1c is provided with an energy storage device (E) and the other sensor units are supplied with energy from the one energy storage device (E).

In another alternative embodiment the other sensor units are supplied with energy from a power subsystem (ps) of the sensor hub 4 which is described in more detail in the following.

Figure 3:
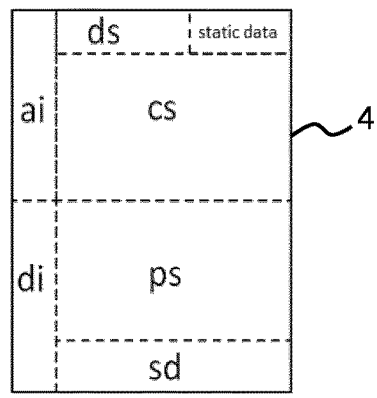
FIG. 3 is a schematic diagram of the sensor hub in the monitoring and diagnostics system in FIG. 1.

FIG. 3 shows the sensor hub 4 in the monitoring and diagnostics system in FIG. 1. The sensor hub 4 contains analogue and digital sensor input ports (ai and di), a data storage (ds), a communication subsystem (cs), a power subsystem (ps), and sensor devices (sd) as a GPS sensor. The input ports (ai and di) are configured to connect with the sensor devices of the sensor units 1a, 1b and 1c. The sensor data is either stored in the data storage (ds) or sent wireless to the receiver 5 by the communication subsystem (cs). The data storage (ds) contains a static data set comprising e.g., wagon number, car type, car keeper data and etc. The power subsystem (ps) is provided to energize the sensor hub 4 itself.

In another embodiment, the power subsystem (ps) can be configured to energize some of the sensor units 1a, 1b and 1c, which have no energy storage device or lack electrical energy. The power subsystem (ps) can contain any type of energy storage device such as batteries, accumulators, capacitors, ultra-capacitors, etc. and may be charged by the power harvester (P) of the sensor units 1a, 1b and 1c. The sensor hub 4 can be so configured, that the power subsystem (ps) is replaceable.

In another embodiment, the sensor hub (4) may contain only a part of the above mentioned devices ai, di, ds, cs, ps and sd.

As a further concrete embodiment, a brake system (not shown) of the freight car 10 contains a control valve (e.g., a KE™ valve), air tanks (reservoir, auxiliary reservoir, emergency reservoir etc.) and brake cylinders in fluid communication with each other via brake pipes. The sensor unit 1a is connected directly with or integrated in the control valve to measure brake cylinder pressure, brake pipe pressure, emergency reservoir pressure, auxiliary reservoir pressure, control pressure, weight signal pressure and etc. The sensor units 1b are connected with the brake mechanism 12 to measure wheel geometry related data. The sensor unit 1c is installed in the freight car 10 to measure freight goods related data.

The measured sensor data from the sensor units 1a, 1b and 1c is sent to the sensor hub 4 and from the sensor hub 4 to the receiver 5. The data sent from the sensor hub 4 to the receiver 5 may also contain GPS coordinates and static data, such as the wagon number and/or car keeper information.

As a more detailed embodiment, a power harvester (not shown) is provided with the sensor unit 1a and it is a micro-turbine connected in the path of the air flow in the brake system (e.g., output to the atmosphere). The micro-turbine is optionally a so called Tesla turbine, as it has a low air resistance when placed in the air flow. It is also possible to install an additional air tank in the brake system and connect the micro-turbine in the path of the air flow of the additional tank. In this example, the micro-turbine is configured to generate electrical energy from the air flow to charge the energy storage device (not shown), which is e.g., also provided with the sensor unit 1a. The monitoring and diagnostics system is so configured, that the stored energy in the sensor unit 1a can be used to energize some or all of the sensor units 1a, 1b, and 1c.

The invention claimed is:

1. A monitoring and diagnostics system for a rail car comprising:
   multiple sensor units, each comprising sensor devices and a data transfer unit, wherein the multiple sensor units comprise at least one power harvester configured to convert ambient energy into electrical energy, and energy storage configured to store the electrical energy generated by the power harvester;
   a sensor hub which comprises a communication subsystem, the sensor hub comprises at least one analogue input port and one digital input port; and a receiver,
wherein the data transfer unit is configured so that the sensor units transfer detected/measured data to the sensor hub and the communication subsystem is configured so that the sensor hub transfers the data to the receiver either with cable or wirelessly,
wherein the power harvester is configured to energize the sensor devices and the data transfer unit, and charge the energy storage,
wherein one of the sensor units is connected directly with or integrated in a control valve of a brake system of the rail car, and
wherein the receiver is a back office server.

2. The monitoring and diagnostics system of claim 1, wherein the sensor hub has sensor devices.

3. The monitoring and diagnostics system of claim 1, wherein the sensor hub has a GPS sensor.

4. The monitoring and diagnostics system of claim 1, wherein the power harvester is a photovoltaic panel, a thermoelectric generator, a piezoelectric generator, an axle bearing generator or a small turbine.

5. The monitoring and diagnostics system of claim 1, wherein the energy storage is any of batteries, accumulators, capacitors, or ultra-capacitors.

6. The monitoring and diagnostics system of claim 1, further comprising at least one sensor unit that contains neither a power harvester nor an energy storage means and is configured to be powered from one of the other sensor units which has an energy storage, or from the sensor hub.

7. The monitoring and diagnostics system of claim 1, further comprising at least one sensor unit that contains neither a power harvester nor an energy storage means and is configured to be powered from one of the other sensor units which has an energy storage, or from the sensor hub.

8. The monitoring and diagnostics system of claim 1, wherein the sensor units comprise a pressure sensor, and/or a temperature sensor, and/or an accelerometer, and/or a vibration sensor.

9. The monitoring and diagnostics system of claim 1, wherein the sensor hub has a data storage.

10. The monitoring and diagnostics system claim 9, wherein the data storage of the sensor hub is configured to store static data of the rail car.

* * * * *